US006953216B2

(12) United States Patent
Held

(10) Patent No.: US 6,953,216 B2
(45) Date of Patent: Oct. 11, 2005

(54) CART CANOPY FRAME

(75) Inventor: William T. Held, 191 Buffalo Creek Rd., Elma, NY (US) 14059

(73) Assignee: William T. Held, Elma, NY (US)

( * ) Notice: Subject to any disclaimer, the term of this patent is extended or adjusted under 35 U.S.C. 154(b) by 0 days.

(21) Appl. No.: 10/896,516

(22) Filed: Jul. 22, 2004

(65) Prior Publication Data

US 2005/0017537 A1 Jan. 27, 2005

Related U.S. Application Data

(60) Provisional application No. 60/489,224, filed on Jul. 22, 2003.

(51) Int. Cl.[7] .................................................. B60P 7/02

(52) U.S. Cl. ................ 296/102; 296/100.14; 296/77.1; 780/DIG. 5

(58) Field of Search ........................... 296/102, 100.11, 296/100.16, 100.17, 100.18, 77.1, 136.1, 136.01, 136.12, 136.13, 100.14; 135/88.01, 88.03, 88.05; 280/DIG. 5, 288.4; 206/315.4

(56) References Cited

U.S. PATENT DOCUMENTS

| | | | | |
|---|---|---|---|---|
| 4,830,037 | A | 5/1989 | Held | |
| 5,217,275 | A | 6/1993 | Ridge | |
| 6,216,714 | B1 | 4/2001 | Tucker | |
| 6,227,603 | B1 | 5/2001 | Brock | |
| 6,471,281 | B1 | 10/2002 | Tyrer et al. | |
| 6,663,162 | B1 * | 12/2003 | Tyrer | 296/100.14 |

* cited by examiner

*Primary Examiner*—H. Gutman
(74) *Attorney, Agent, or Firm*—Hodgson Russ LLP

(57) ABSTRACT

A support frame for a cart canopy and a method of supporting a cart canopy are shown. The support frame may have a pivotable support bar and a foundation bar. The foundation bar may be connected to the support bar so as to allow the support bar to pivot from the foundation bar. The foundation bar may have a first end and a second end, wherein the first end has a first curved portion to which a first end of the pivotable support bar may be attached. The first end of the foundation bar may have a first step portion positioned proximate to the first curved portion, and the first step portion may be oriented to raise the elevation of the first end.

14 Claims, 6 Drawing Sheets

CART CANOPY FRAME

CROSS-REFERENCE TO RELATED APPLICATION

This application claims the benefit of priority to U.S. provisional patent application Ser. No. 60/489,224, filed on Jul. 22, 2003.

FIELD OF THE INVENTION

The present invention relates to frames for canopies carried by vehicles, such as golf carts.

BACKGROUND OF THE INVENTION

Some vehicles, such as golf carts, have a storage area located behind the driver's seat where equipment, such as golf clubs, may be kept. A protective canopy may be attached to the cart to shield the storage area and its contents from rain and sun. Although the prior art shows frames for cart canopies, those frames interfere with space on the cart that might otherwise be used. Consequently, there is a need for a frame that provides support for the canopy and allows certain space on the cart to be used more effectively.

SUMMARY OF THE INVENTION

The present invention includes a canopy frame, which may be used to support a canopy that shields a storage area of a vehicle. The invention may be embodied as a foundation bar having a curved portion positioned proximate to an end of the foundation bar. The invention may also be embodied as a foundation bar having a stepped portion positioned proximate to an end of the bar. Such a foundation bar may be considered to be a means for connecting to the cart a pivotable support bar of the canopy frame.

The invention may allow access to items stored on the side of a rear storage area of the golf cart while the attached canopy protects golf bags and other items which may be stored in the rear storage area of the golf cart. The term "golf cart" is used herein to refer to a particular embodiment of the invention, but the invention is not limited to use on golf carts, and may be used with other types of vehicles.

A method according to the invention may include providing a pivotable support bar and a foundation bar, attaching the foundation bar to the cart, attaching the support bar to the foundation bar, and attaching a canopy to the support bar.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
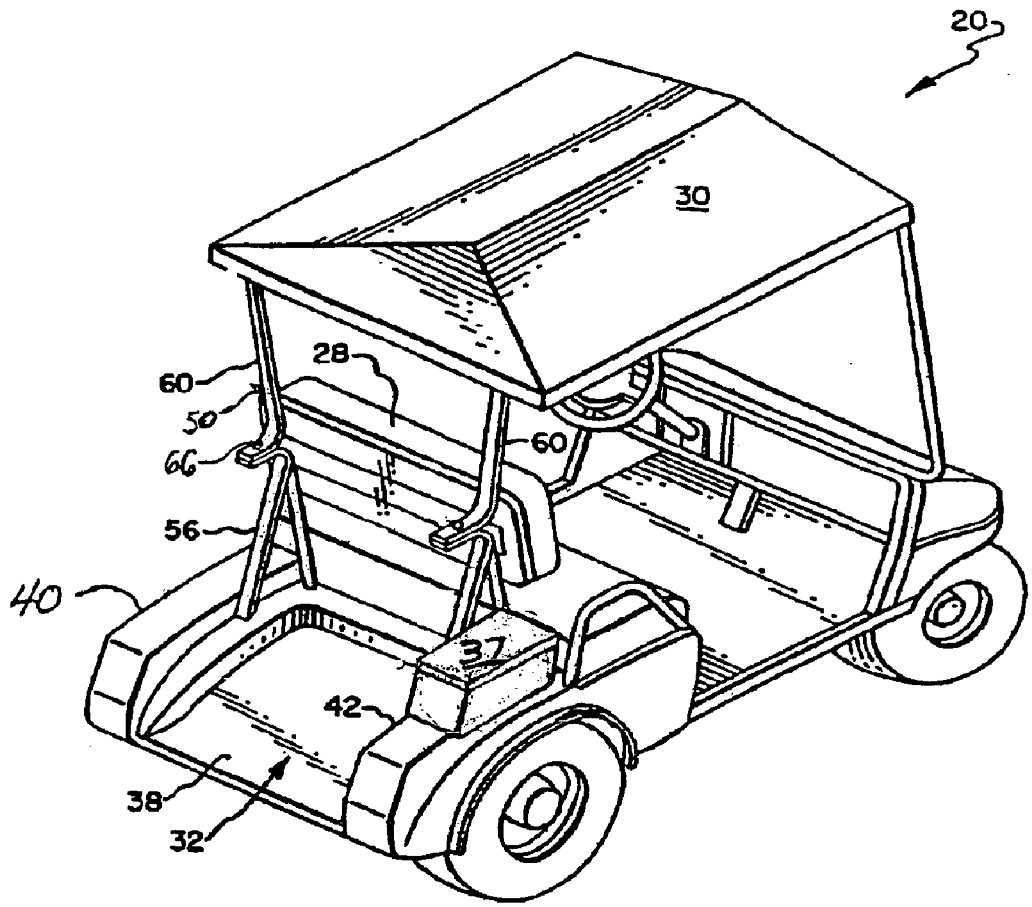
FIG. 1, which is a perspective view of a prior art golf cart without the frame that is the subject of the claims found at the end of this document.
Figure 2:
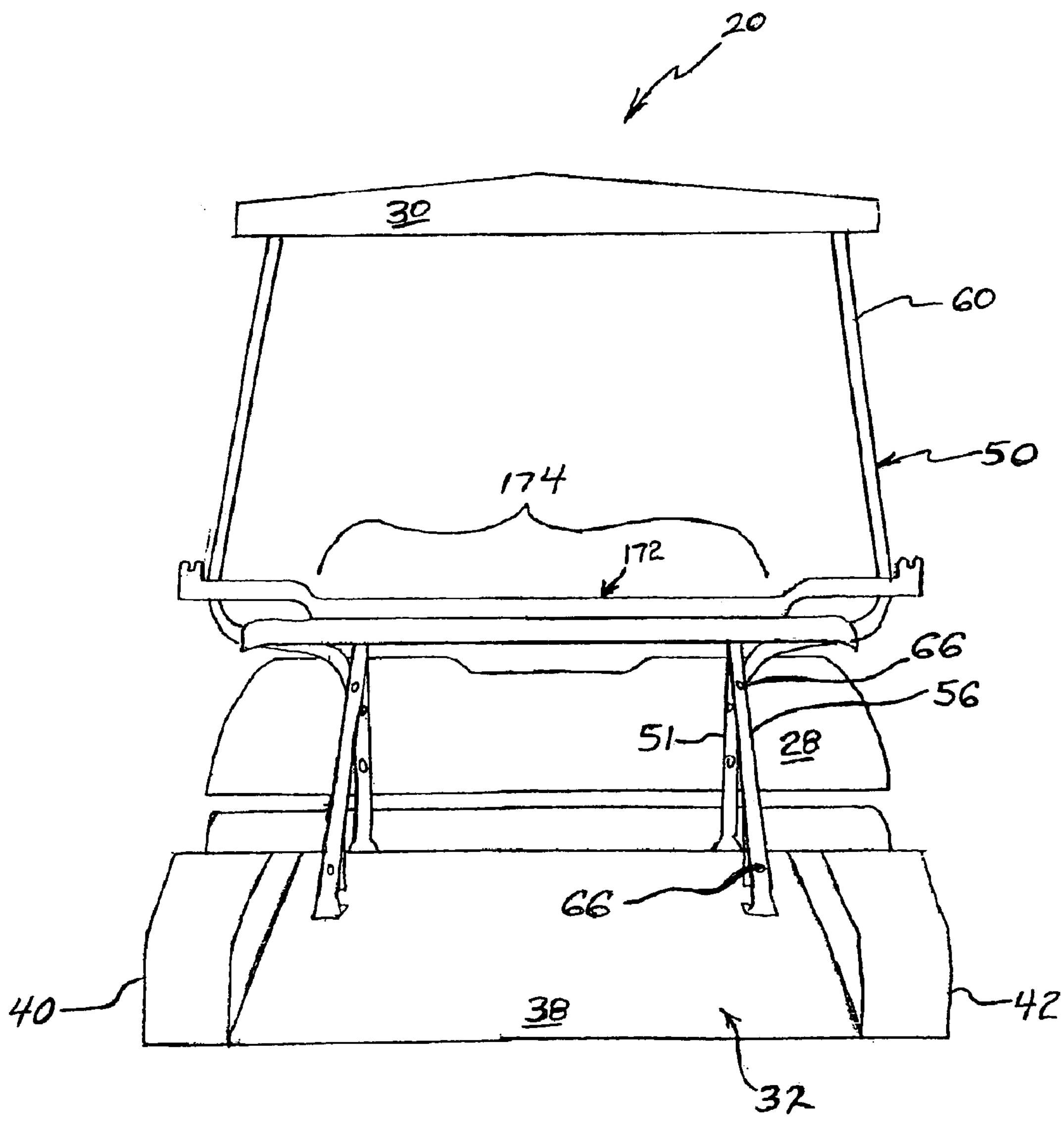
FIG. 2, which is a rear view of a golf cart and a portion of the frame according to the invention.
Figure 3:
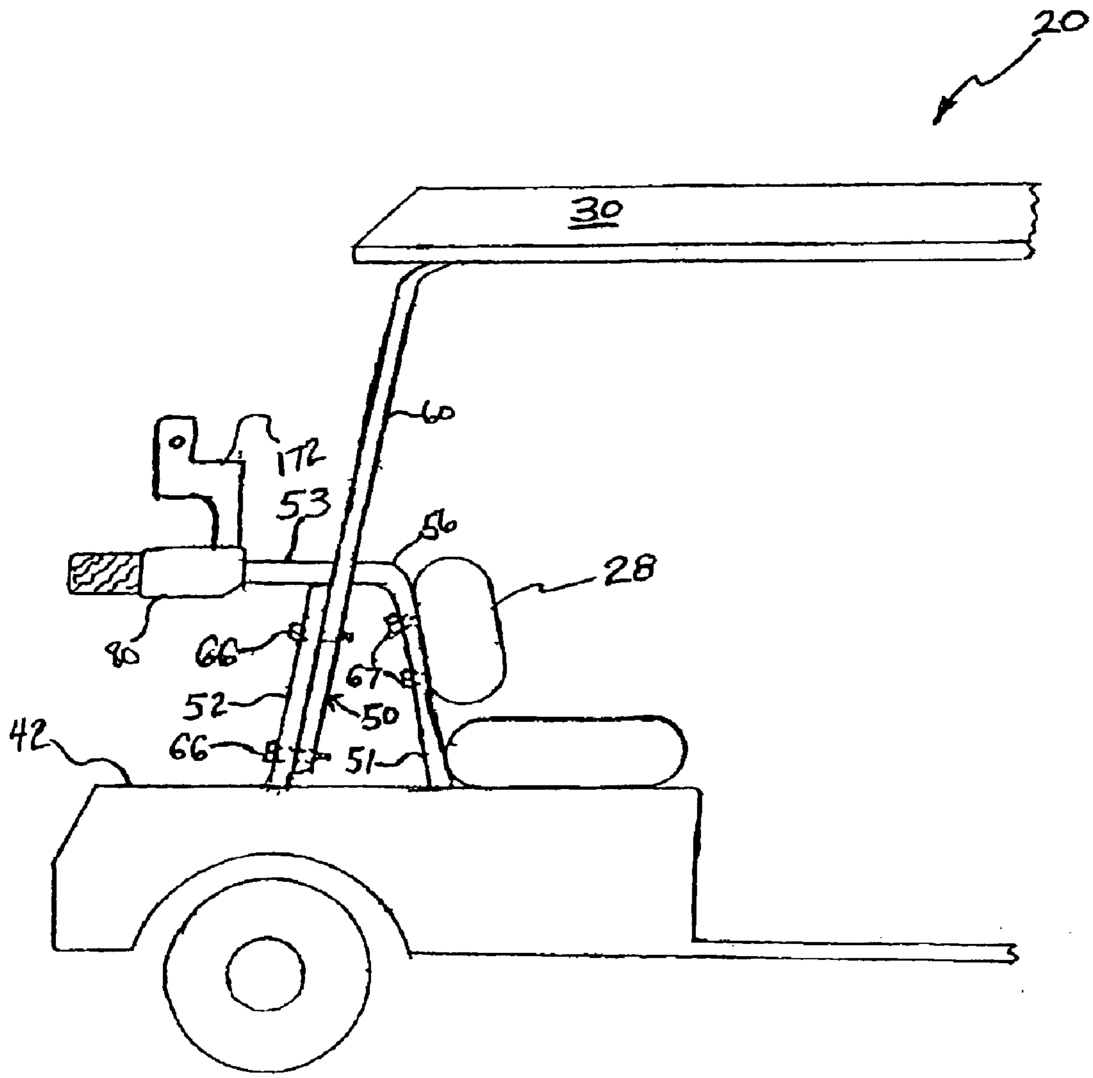
FIG. 3, which is a side view of a golf cart and a portion of the frame according to the invention.

A first example of a golf cart without the frame/canopy combination is shown in FIG. 1. This first example of a golf cart is discussed in U.S. Pat. No. 4,830,037 (the "'037 patent") wherein an example of a prior art frame/canopy combination is shown and described. A second example of a golf cart is shown in FIGS. 2 and 3. To simplify FIGS. 1, 2 and 3, the canopy is not shown. Instead, a canopy 10 can be seen in FIG. 4.

With reference to the conventional golf cart 20 shown in FIG. 1, the cart 20 has a roof 30, which covers the occupants of the cart, and a seat 28. Behind the seat 28 is a storage area 32 where golf clubs and other items may be kept. The storage area 32 may be defined by a floor 38 and two sides 40, 42. It may be desirable to store items on one or both of the sides 40, 42. For example, a cooler 37 is shown in FIG. 1 stored on side 42. Preferably, such items are stored near the seat 28 in order to secure the item, such as the cooler 37, against the back of the seat 28.

In an example of a conventional frame/canopy combination, as shown in the '037 patent, a frame includes one or more bar sections, labeled 72 and 74 in the '037 patent, which are attached to roof support post arrangements 50. The post arrangements 50 may be formed by lower roof support posts 56 and upper roof support posts 60. The posts 56, 60 have arcuate ends which meet and are joined, for example, by a bolt 66. The bar sections are shown in the '037 patent attached to the arcuate ends of the posts 56, 60 by means of bolt 66. The prior art bar sections extend over the sides 40, 42 of the golf cart 20.

FIGS. 2 and 3 show a second example of a conventional golf cart 20 having a foundation bar 172 which differs from the bar sections shown in the '037 patent. The post arrangements 50 are formed by lower roof support posts 56, and upper roof support posts 60. The upper roof support posts 60 attach to the lower roof support posts 56 in a different manner than in the '037 patent. As shown in FIG. 2, the upper roof support posts 60 are attached at one end to the roof 30 and at the other end to the lower roof support posts 56 by bolts 66.

A side view of the second example of a conventional golf cart 20 is shown in FIG. 3. It can be seen that the lower roof support posts 56 may be constructed from two pieces, namely a curved portion 51 and a straight portion 52. One end of the straight portion 52 may be attached to a substantially horizontal end 53 of the curved portion 51 by a weld, and the other end of the straight portion 52 may be attached to the floor 38 of the storage area 32, as best seen in FIG. 2. The curved portion 51 of the lower roof support post 56 may be attached to the seat 28 by bolts 67, and attached to the floor 38 in a conventional manner, for example, by bolts.

In a conventional golf cart 20, such as the first and second examples described above, a golf bag holder 80 may be attached. Generally, the golf bag holder 80 is configured to fit over the arcuate ends of the roof support posts 56, 60, in the first example, or over the substantially horizontal ends 53 of the curved portion 51 of the lower roof support posts 56, in the second example. The golf bag holder 80 may be secured to the post arrangements 50 by bolts, such as bolts 66 shown in FIGS. 1 and 4.

If a frame, such as the one described in the '037 patent is used on a conventional golf cart 20, it may not be possible to store items on the sides 40, 42 because the bar sections (labeled 72 and 74 in the '037 Patent) extend over the sides 40, 42 at a location which is desirable for use as a storage area. Further, even if an item is capable of being stored on the sides 40, 42 while using a frame such as the one described in the '037 patent, that item may be difficult to utilize because the extended bar sections may require the user to first remove the item from the side 40, 42 in order to utilize the item. For example, even if a cooler could be stored on the side 42 of the cart 20, it might not be possible to fully open the lid of such a cooler 37 to allow access to the material inside the cooler because the bar sections prevent the lid from being moved to a fully open position.

A foundation bar 172, in accordance with the present invention, is shown in FIGS. 2, 3, 4 and 5. The foundation bar 172 may be a single piece of molded plastic or other suitable material. The foundation bar 172 may have a first end 180 that may have a first curved portion 175 or may have a first bracket 104A, or both. The foundation bar 172 may have a second end 182 that may have a second curved portion 178, or may have a second bracket 104B, or both. One or more of the curved portions 175, 178 may be shaped like the letter "S". The first end 180 and second end 182 may be fashioned so they are capable of each receiving a different end of the support bar 98. A connector 183, such as a bolt, may extend through hole 106A in the bracket 104A and through support bar 98 in order to allow the support bar 98 to pivot from the foundation bar 172. A similar arrangement may be made with a different end of support bar 98 using another connector 184 and through hole 106B in the bracket 104B.

Figure 4:
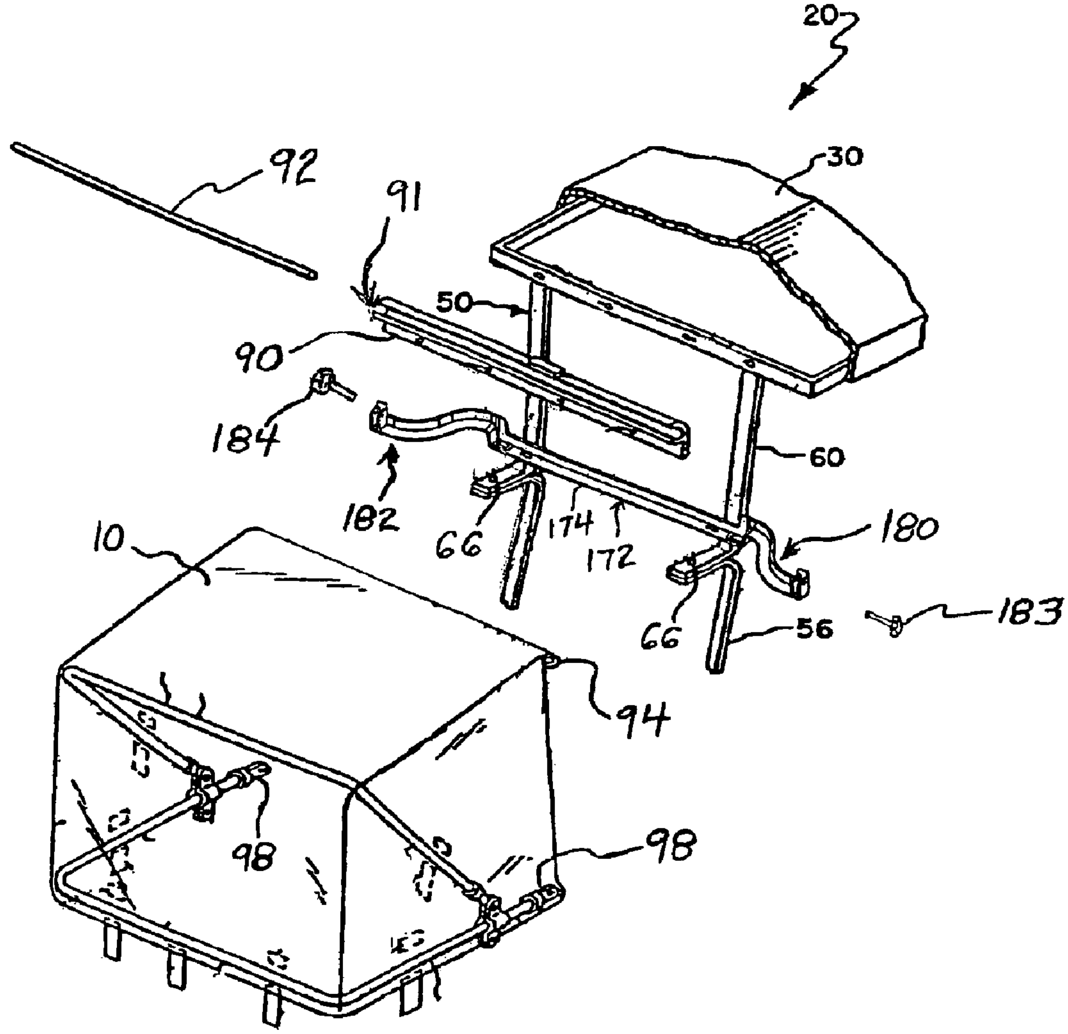
FIG. 4, which is an exploded perspective view of certain parts of a golf cart, a canopy and a frame according to the invention.
Figure 5:
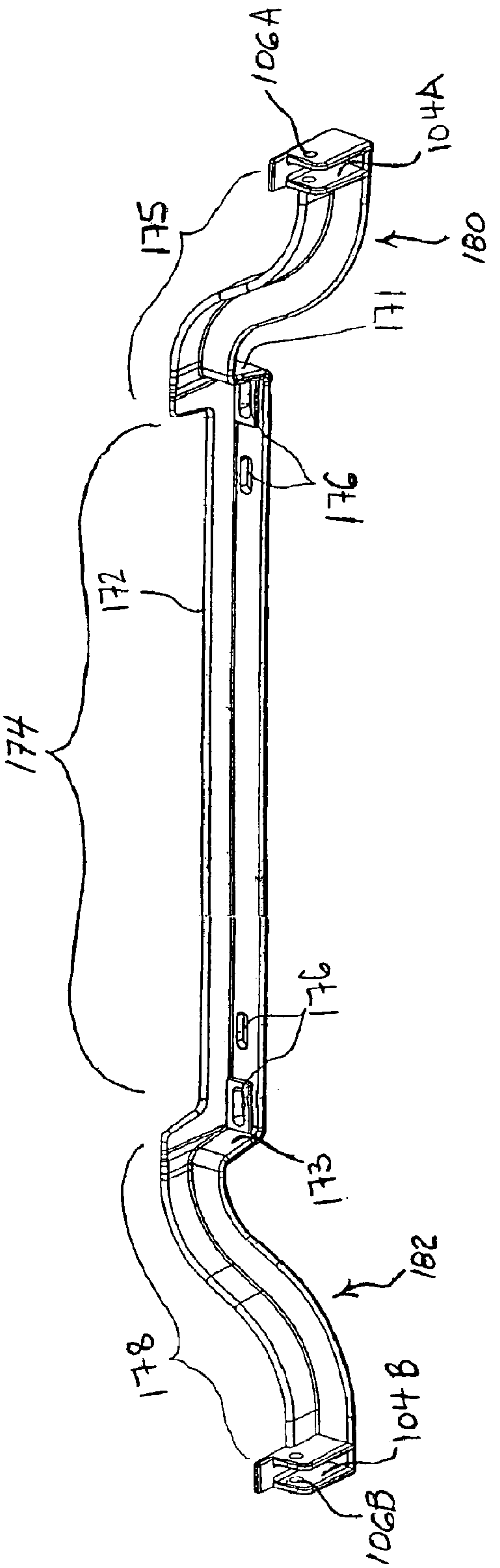
FIG. 5, which is a perspective view of a foundation bar according to the invention.
Figure 6:
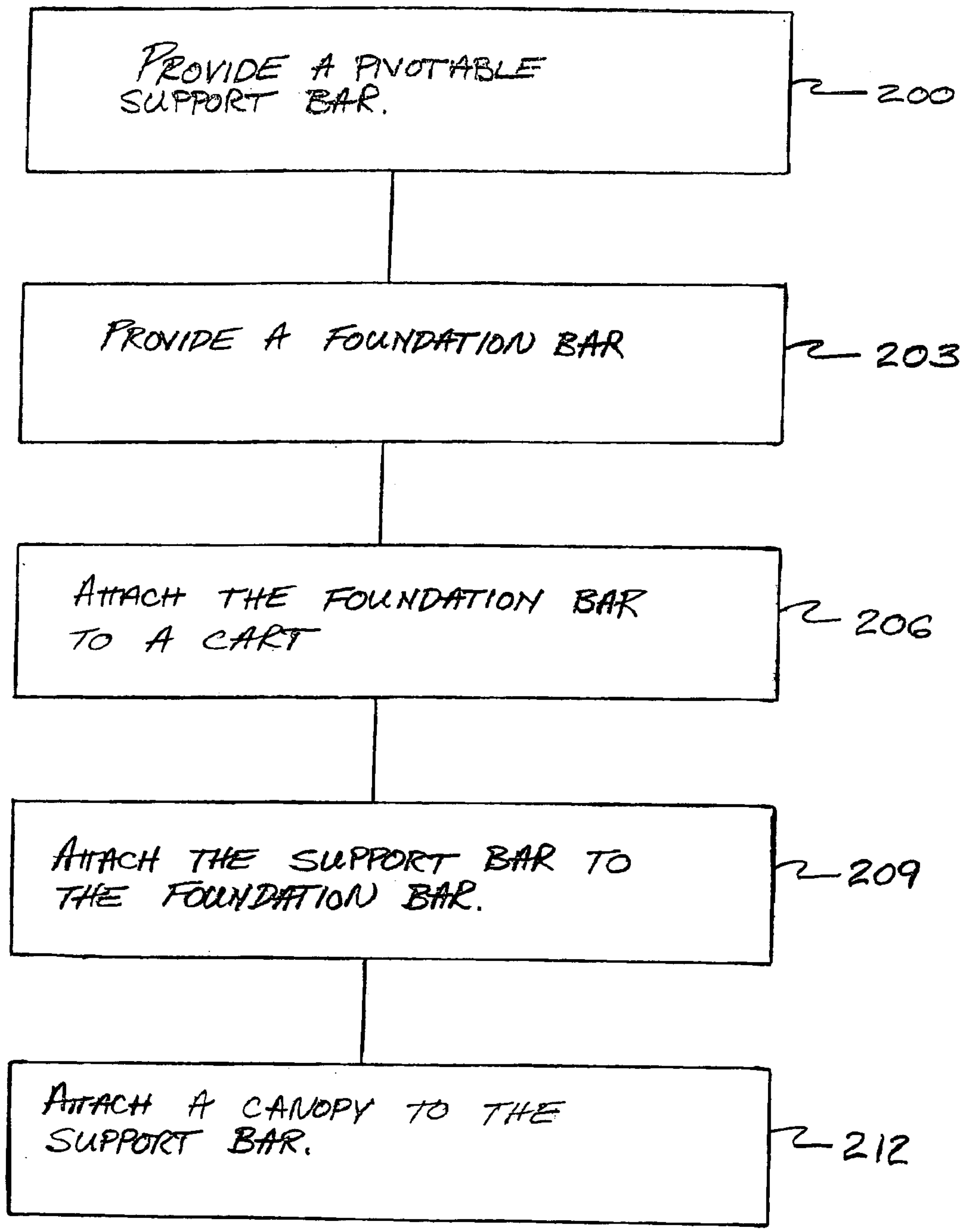
FIG. 6, which is a flow chart depicting a method according to the invention.

The foundation bar 172 may have a substantially straight middle portion 174 which may have one or more through-holes 176. The middle portion 174 may extend between the first end 180 and the second end 182 of the foundation bar 172. The through-holes 176 may be provided to receive therethrough a connector, such as a bolt 66, for attaching the foundation bar 172 to the post arrangements 50 of the golf cart 20. As shown in FIG. 2, the foundation bar 172 may be fastened to the substantially horizontal end 53 of the curved portion 51 of the lower roof support posts 56. As shown in FIG. 4, the foundation bar 172 may be fastened to the arcuate ends of the roof support posts 56, 60. In either example, the foundation bar 172 may be fastened to the post arrangements 50 with bolts.

The foundation bar 172 may include a first curved portion 175 and a second curved portion 178. These curved portions 175, 178 may extend over the substantially horizontal sides 40, 42 of the golf cart 20 at locations that are further reward from the seat 28 than the location of the middle portion 174 of the foundation bar 172. Consequently, there is more space to store items on the sides 40, 42 between the seat 28 and the curved portions 175, 178 because even if the curved portions 175, 178 extend over the sides 40, 42, the curved portions 175, 178 will do so at locations that are further from the seat 28 than the middle portion 174.

The foundation bar 172 may also include step portions 171, 173. These step portions 171, 173 may be oriented to raise the elevation of the curved portions 175, 178 further above the sides 40, 42 than the curved portions 175, 178 would otherwise be. As a result, larger items may be stored on the sides 40, 42, or it may be easier to access items stored on the sides 40, 42. For example, the step portions 171, 173 may provide enough space above the cooler 37 to permit the lid of the cooler 37 to be moved to a fully opened position. The step portions 171, 173 may be positioned proximate to the curved portions 175, 178 or may provide a transition from the middle portion 174 to one or more of the ends 180, 182 of the foundation bar 172.

In both examples of the golf cart 20 described herein, the canopy may be attached to the roof 30 of the golf cart 20, for example as described in the '037 patent. An attachment member 90 may be secured to the back edge of the roof 30. The attachment member 90 may include a C-shaped channel 91 adapted to accept a dowel 92 for securing the canopy to the roof 30. The dowel 92 may be constructed of flexible plastic or other suitable material, and may fit within a sleeve 94 formed on the uppermost edge of the canopy 10. The dowel 92 and the edge of the canopy 10, are then slid into the C-shaped channel 91 of the attachment member 90.

The ends 104A, 104B of the foundation bar 172 may be adapted for pivotally connecting other portions of the canopy frame. For example, the ends 104A, 104B may be fashioned to pivotally mate with ends of a support bar 98, which contacts and directly supports the canopy 10.

In a method according to the invention, a cart canopy may be supported by providing 200 a pivotable support bar and providing 203 a foundation bar. The foundation bar may have a first end and a second end, wherein the first end has a first curved portion which includes a first bracket capable of receiving an end of the pivotable support bar. The foundation bar may be attached 206 to a cart, and the support bar may be attached to the foundation bar. The support bar may be attached 209 to the foundation bar so as to allow the support bar to pivot from the foundation bar. A canopy may be attached 212 to the support bar. In this fashion, a cart canopy may be provided in a deployed position to provide a cover for a storage area of the cart, and selectively moved to an undeployed position where the canopy may be stored out of the way of someone desiring access to the storage area.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A support frame for a cart canopy, comprising:

a pivotable support bar;

a foundation bar connected to the support bar so as to allow the support bar to pivot from the foundation bar, the foundation bar having a first end and a second end, wherein the first end has a first curved portion to which a first end of the pivotable support bar may be attached, and the first end of the foundation bar has a first step portion positioned proximate to the first curved portion, and the first step portion is oriented to raise the elevation of the first end.

2. The frame of claim 1, further comprising a first bracket attached to the first end and capable of receiving the first end of the pivotable support bar.

3. The frame of claim 2, wherein the second end of the foundation bar has a second curved portion which includes a second bracket capable of receiving a second end of the pivotable support bar.

4. The frame of claim 3, wherein the second end of the foundation bar has a second step portion positioned proximate to the second curved portion.

5. The frame of claim 1, wherein the foundation bar includes a substantially straight middle portion extending between the first end and the second end.

6. The frame of claim 1, wherein the foundation bar is attached to a roof support post.

7. The frame of claim 6, wherein the first end of the foundation bar extends over a substantially horizontal side portion of the cart.

8. The frame of claim 6, wherein the foundation bar includes a middle portion extending between the first end and the second end, and wherein the middle portion has a hole therethrough for receiving a connector that serves to attach the foundation bar to the roof support post.

9. The frame of claim 1, wherein the curved portion is shaped like the letter "S".

10. The frame of claim 1, wherein the foundation bar includes (a) a substantially straight middle portion extending between the first end and the second end, (b) a first step portion providing a transition from the middle portion to the first end, and (c) a second step portion providing a transition from the middle portion to the second end.

11. The frame of claim 10, wherein the second end has a bracket to which another end of the pivotable support bar may be attached.

12. A canopy support frame for a cart canopy, comprising a means for connecting a pivotable support bar to a cart, the means for connecting having a first end and a second end, wherein the first end has a curved portion which includes a bracket capable of receiving an end of the pivotable support bar, and wherein the first end of the means for connecting has a step portion positioned proximate to the curved portion, and the step portion is oriented to raise the elevation of the first end.

13. The frame of claim 12, wherein the first end extends over a substantially horizontal side portion of the cart when the means for connecting is attached to the cart.

14. A method of supporting a cart canopy, comprising:

providing a pivotable support bar;

providing a foundation bar having a first end and a second end, wherein the first end has a first curved portion which includes a first bracket capable of receiving an end of the pivotable support bar, and the first end of the foundation bar has a first step portion positioned proximate to the first curved portion, and the first step portion is oriented to raise the elevation of the first end;

attaching the foundation bar to a cart;

attaching the support bar to the foundation bar so as to allow the support bar to pivot from the foundation bar; and attaching a canopy to the support bar.

* * * * *